Sept. 22, 1964 W. W. ALLISON 3,150,337

ELECTRO-MECHANICAL RESONANT DEVICE

Filed Feb. 27, 1961 2 Sheets-Sheet 1

INVENTOR.
William W. Allison
BY
James A. Eiseman
ATTORNEY

INVENTOR.
William W. Allison
BY
James A. Eisenman
ATTORNEY

United States Patent Office 3,150,337
Patented Sept. 22, 1964

3,150,337
ELECTRO-MECHANICAL RESONANT DEVICE
William W. Allison, Huntington Station, N.Y., assignor to Armec Corporation, Huntington Station, N.Y., a corporation of New York
Filed Feb. 27, 1961, Ser. No. 104,192
9 Claims. (Cl. 333—71)

This invention relates to resonant devices. More particularly, the invention relates to electromechanical resonators affording precise frequencies over a wide range of operating conditions and useful as frequency sources or references, filters and the like.

In present day instrumentation, there are exacting requirements for precision frequency sources. Precisely controlled or regulated frequencies are typically derived from sources which are based on natural periods of resonance, either electronic or mechanical.

Electronic resonance can be based, for example, on tuned resonant circuits which are made to oscillate at precise frequencies under certain conditions of energization. Mechanical resonance, which can be induced either electrically, electromagnetically or mechanically, is based on mechanical motions, such as the swinging of a pendulum, the oscillation of a balance wheel, or the vibration of members of particular geometric design, such as crystals and tuning forks. Outputs from such mechanical devices can be either in the form of an electrical A.C. signal or a directly coupled mechanical drive.

Each of these many resonant devices has found application in present day technology, depending on the frequency range, the accuracy requirements, the cost, and the ability to perform under a wide range of environmental influences, including high and low temperatures, vibration, acceleration, and shock. The present invention is concerned with mechanical resonators which heretofore have been relatively vulnerable to environmental influences and are difficult to manufacture where both precision and small size are required.

It is, therefore, one object of the present invention to provide new and improved electromechanical resonators which overcome many of the inherent disadvantages of conventional mechanical resonators by affording precision operation under a wide range of operating conditions.

Another object of the invention is to provide electromechanical resonators which can be made relatively insensitive to shock, vibration, acceleration and temperature variation.

Another object of the invention is to provide improved electromechanical resonators which are small, robust, inexpensive and accurate, and which are useful in instrumentation as frequency sources, references, filters and, broadly speaking, in any application in which timing is critical.

In accordance with the present invention, there is provided a flat, symmetrical resonator formed of an elastic material, such as metal, and having a central body portion carrying a plurality of at least four angularly spaced arms which vibrate in directions perpendicular to the flat surface or normal plane of the material and which have a common node in the central portion. In one preferred arrangement, the resonator takes a cruciform geometry in which the arms are of generally similar shape and size and which is supported at the common nodal point. The arms are set into coordinated and concomitant mechanical vibration out of their normal plane by means, for example, of an electromagnetic driving system, so that adjacent arms move in opposite directions, which is to say opposite or diagonally opposed arms move in the same direction, first away from and then toward and through the normal plane. Thus, the inertial reaction of the vibration of the arms on the body of the resonator will sum to zero and there will be a node or point of zero motion within the body which is normally at its geometric center. Opposite arms have a force reaction at the node which is additive and a torque reaction which cancels. The other pair of arms likewise cancel each other in torque, but have a force component equal and opposite to the first pair, so that there is complete cancellation at the nodal point.

The resonator is supported at its nodal point and consequently the mounting does not affect its resonant action. If desired, the resonator can be supported on a coupling spring which joins the resonator to the base. The coupling spring can also be cruciform in shape, disposed immediately beneath the resonator and turned at a 45° angle thereto, so that the arms of the resonator overhang the base. The arms of the coupling spring are supported on posts joined to the base and axial motions of the nodal point of the resonator and the spring are damped, as by friction, viscous material or damping masses.

To excite the desired primary mode of vibration of the resonator plate, it is required that only one arm be driven at the natural frequency of the resonator, mechanical coupling through the body of the resonator exciting all other arms into vibration in the primary mode. In a preferred driving arrangement, separate electromagnetic driving and sensing or pickup coils are used, each including a magnetic flux passing from a point near the tip of the arm to a coil supported on the base. When the frequency of the current in the coil coincides with the natural frequency of the resonator, the latter will vibrate in its primary mode.

In operation, movement of an arm associated with a pickup coil results in variation of the magnetic flux by varying the reluctance of the magnetic path. Flux variations generate voltage which, when amplified, affords a source of power for the driving coil. When the system is arranged so that the driving coil has a current flowing as a result of the voltage from the pickup coil, to cause vibration of the resonator in a manner increasing the alternating voltage from the pickup coil, the resonator will be driven in sustained vibration at its natural resonant frequency. Cancellation of induced voltages resulting from translational movement of the entire resonator, i.e., movement of the nodal point, is effected by providing a pair of pickup coils under two adjacent arms and a pair of driving coils under the other two adjacent arms and connected and polarized by the use of permanent magnets, carried either by the base or by the arms, so as to produce voltages which are additive when adjacent arms are moving in opposite directions and subtractive when they are moving in the same direction. Thus the unit becomes highly insensitive to external motion or shock in all planes and hence differs basically from edge-supported crystal resonators and from so-called back-to-back tuning forks in which the paired tines move toward and away from each other in the plane of assembly.

The above and other features and objects of the present invention will be apparent from the following description of one preferred arrangement of the invention, taken in conjunction with the accompanying drawing in which:

FIGURES 1 and 2 are, respectively, side and bottom views of a housed electromagnetically driven resonator unit;

FIGURES 3 and 4 are enlarged views in transverse section of the resonator taken on the lines 3—3 and 4—4, respectively, of FIGURE 1 looking in the directions of the arrows;

FIGURES 5 and 6 are enlarged views in vertical section taken on the lines 5—5 and 6—6, respectively, of FIGURES 3 and 4, looking in the direction of the arrows;

Figure 5:
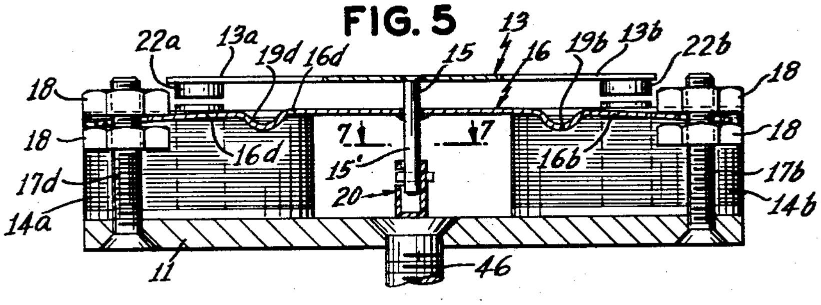
Figure 6:
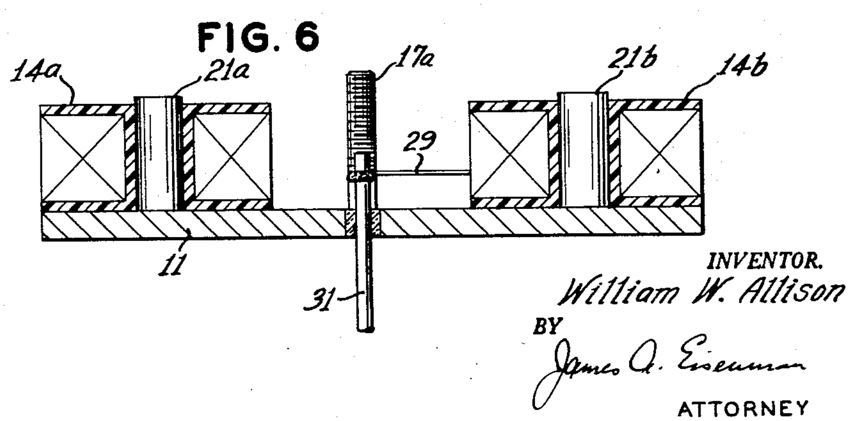

Referring to the drawings, the invention is illustrated as embodied in a resonator assembly 10, including a base 11, preferably of ferromagnetic material, and a cover or housing 12. Supported within the housing on the base 11 are a resonant plate 13 and an array of four electromagnetic coils **14*a*, 14*b*, 14*c*, and 14*d*. The resonant member 13 is formed of elastic material such as metal and is preferably cruciate in its form, including four arms or limbs 13*a*, 13*b*, 13*c* and 13*d* overhanging the respective coils 14*a*, 14*b*, 14*c* and 14*d*. The resonant member 13 is supported at its geometric center by a mounting post 15** (FIGURE 5). The point of attachment represents a common nodal point, as will be described more fully below.

While for certain applications in which shock mounting is not critical, the post 15 can be base-supported by a direct coupling, it is, in the illustrated arrangement, supported through a coupling spring 16, which can also be cruciform in its geometry. The coupling spring 16 is turned at a 45° angle to the resonant member 13, so that its respective arms **16*a*, 16*b*, 16*c* and 16*d* are generally centered between adjacent pairs of electromagnetic coils 14*a*, 14*b*, 14*c* and 14*d*. The free ends of the respective arms 16*a*, 16*b*, 16*c* and 16*d* are fitted over and secured to upstanding, base-mounted posts 17*a*, 17*b*, 17*c* and 17*d*, respectively by suitable means such as lock nuts 18. While the arms are rigidly secured to their mounting posts, it is preferred that there be a slight clearance between the openings in the respective arms and the mounting posts to afford limited movement in the plane containing the coupling springs 16. The respective spring arms are deformed by offsets 19*a*, 19*b*, 19*c*, and 19*d*** to improve the spring action.

Figures 7, 8, 9:
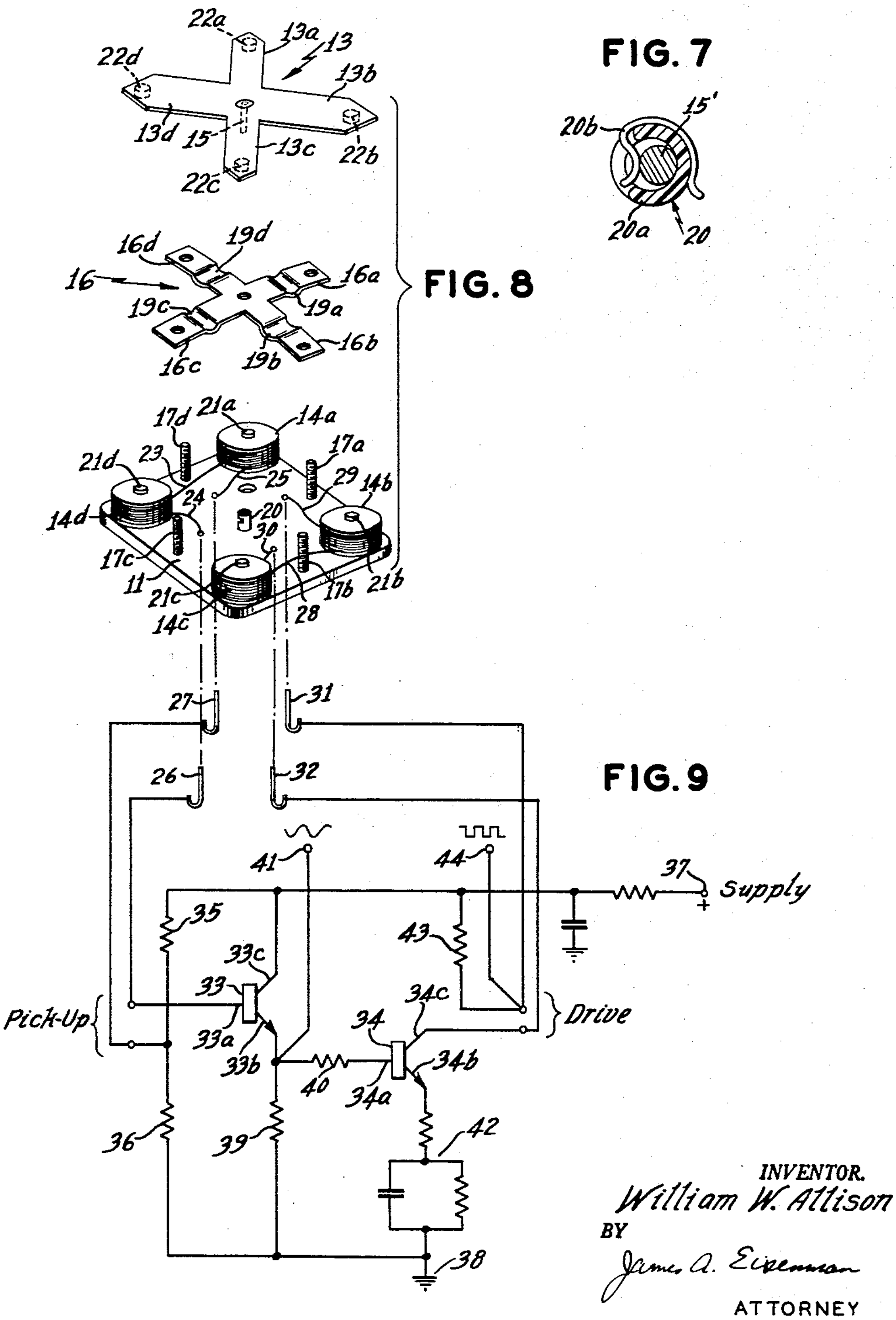
FIGURE 7 is an enlarged, fragmentary view in transverse section taken on the line 7—7 of FIGURE 5.
FIGURE 8 is an exploded view in perspective of a resonator unit removed from its housing.
FIGURE 9 is a schematic diagram of an electrical circuit for operating the resonator.

A depending extension 15′, of the mounting post 15 is lightly frictionally gripped by a damper assembly 20 to damp axial movement of the post 15, and hence transitional movement of the resonant member 13, at the critical frequency of the coupling spring. The damper can take the form, for example, of a plastic sleeve **20*a* slotted to receive spring clip 20*b***, as best seen in FIGURE 7.

Extending through the centers of the respective coils **14*a*, 14*b*, 14*c* and 14*d* are ferromagnetic members 21*a*, 21*b*, 21*c* and 21*d*, respectively, which are magnetically coupled to the base 11. Affixed to the under sides of the respective arms 13*a*, 13*b*, 13*c* and 13*d* of the resonator plate member 13, are small permanent magnets 22*a*, 22*b*, 22*c* and 22*d*. It will be understood that the members 21*a* . . . *d* can also be permanent magnets and, for certain applications, the magnets 22*a* . . . *d*** can be eliminated or replaced by ferromagnetic slugs.

The permanent magnets, whether base or resonator supported, are preferably arranged with three magnets polarized alike and the fourth polarized oppositely. Thus, referring to FIGURE 8, the magnets **22*a*, 22*b*, and 22*d* can be polarized, for example, with their lower ends, i.e., their ends proximate the upstanding ferromagnetic members 21*a*, 21*b* and 21*d*, as south poles and the magnet 22*c* with its lower end north. In such case the coils 14*a*, 14*b*, 14*c* and 14*d* are connected so that the coils 14*a* and 14*d* operate as series-connected pickup coils and the coils 14*b* and 14*c* operate as series-connected drive coils. To this end the coils 14*a* and 14*d* are connected together by a conductor 23 and are connected by conductors 24 and 25, respectively, to pickup terminals 26 and 27. The coils 14*a* and 14*d*** are wound in a clockwise direction from top to bottom as seen in FIGURE 8 and the upper ends of the coils are joined by conductor 23.

The drive coils **14*b* and 14*c*, wound in a counterclockwise direction from top to bottom, are connected from bottom to top by a conductor 28. The upper end of the coil 14*b* and the lower end of the coil 14*c* are connected by conductors 29 and 30, respectively, to terminals 31 and 32**, representing drive terminals.

Referring now to FIGURE 9, there is illustrated an amplifier circuit by means of which the output of the two pickup coils **14*a*, and 14*d* is amplified to energize the drive coils 14*b* and 14*c*** and to furnish square and sine wave outputs.

Figure 1:
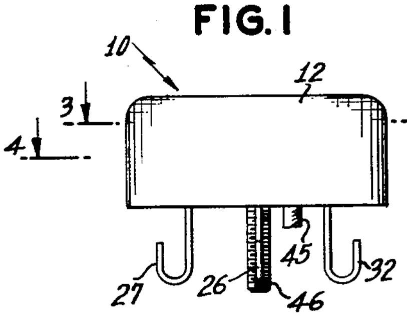
Figure 2:
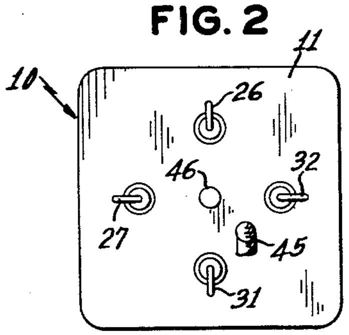

The amplifier circuit includes a pair of junction transistors 33 and 34. The base electrode **33*a* is connected to the pickup terminal 26. The other pickup terminal is connected between a pair of resistors 35 and 36, the former of which is connected to a positive voltage source 37 and the latter to ground at 38. The emitter electrode 33*b* is connected to a sine wave output terminal 41 and to ground through a resistor 39 and to the base 34*a* of the transistor 34 through a resistor 40. The collector electrode 33*c* is connected to the power source 37. The emitter electrode 34*b* of the transistor 34 is connected to ground through an R-C network 42 and the collector 34*c* to the drive terminal 32 of the resonator. The other drive terminal 31 is connected to the positive source 37 via a resistor 43 and to a square wave output terminal 44. The housing is adapted to be evacuated or filled with an inert gas by a fitting 45 (FIGURES 1 and 2) and the entire unit is base-mounted by a thread shank 46**.

In operation, a mode of vibration of the cruciform resonant member 13 results, in which the free ends of diagonally opposed arms move in the same direction which is to say adjacent arms move in opposite directions. Thus, the arms **13*a* and 13*c* will be moving upward while the arms 13*b* and 13*d* are moving downward, and vice versa. In this mode of vibration, in which there is a common nodal point at the geometrical center or the coupling to the post 15, the system is dynamically balanced as it resonates in a symmetrical pattern dictated by the length of the arms and the thickness of the material. The resonant condition is maintained by the interaction of the pickup coils 14*a* and 14*d*, in which voltages are induced by the resonating arms 13*a* and 13*d* and by the drive coils 14*b* and 14*c* which electromagnetically bias the corresponding arms 13*b* and 13*c* to sustain the vibration at the resonant frequency. The combined action of the coils is such that any voltage which might be generated by the translational movement of the assembly, which includes the resonator 13 and the coupling spring 16**, is bucked out.

Figures 3, 4:
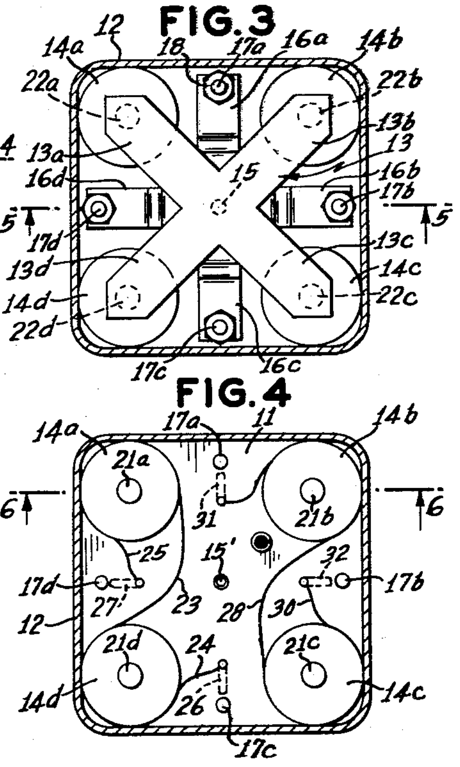

While the invention has been described above having reference to the accompanying drawings, it will be understood that it can take various other forms and arrangements. For example, the resonator can be excited into resonance by driving but one of its arms, and the same or a different arm can be used for the pickup system. Also, a variable flux linkage drive and pickup arrangement can be used in place of the variable reluctance arrangement used for purposes of illustration herein. This can be accomplished, for example, by simply omitting the core portions 21 in favor of hollow cores. In such case it is preferred that the permanent magnets 22 be allowed to partially enter the open cores as the arms of the resonator plate 13 flex downward. The flux path can be improved in either the variable reluctance or the variable flux linkage systems by including overhanging straps of ferromagnetic material on the free ends of the arms, as indicated by the broken lines 48 on the arm **13*d*** in FIGURE 3.

It should also be understood that other drives and pickups than the electromagnetic types described above can be used. For example, piezoelectric crystal elements can be physically coupled to one or more of the arms of the resonator so that the motion resulting from the flexing of the drive crystal, suitably energized by the feedback voltages from the amplifier, drives the resonator which in turn drives the pickup crystal to generate the frequency-controlling voltage which is fed into the input of the amplifier. The physical coupling between the crystals and the arms of the resonator should normally occur quite close to the nodal center rather than at the ends of the arms, because of the relatively small motion or travel which inheres in excited piexoelectric crystals.

The invention should also not be regarded as limited to the particular amplifier circuit described above. For example, for certain purposes a single stage amplifier can be used as can more elaborate circuitry to accomplish specific functions which might be desired. The invention should not therefore be regarded as limited except as defined in the following claims.

I claim:

1. A resonant device comprising a frame, a resonator member having at least four generally coplanar portions extending from a common center and arrayed symmetrically with pairs of the portions being aligned across the center, co-acting means carried by at least one of said portions and by the frame of said device to apply periodic forces to said member normal to said plane to induce resonance in which all portions vibrate out of their common plane in coordinated unison with adjacent angularly spaced-apart portions flexing in opposite directions at any given time, thereby to define a mode of resonance in which aligned portions across the center move away from or toward the plane at any given time, said mode of resonance thereby defining a single node in the resonator member at the common center, and means connected to said frame to support said member at said common center and nodal point.

2. Resonant apparatus comprising a supporting frame, a resonant member comprising a resonator plate of elastic material and having a plurality of at least four normally coplanar laterally extending portions having a common center portion, said portions of the member having a common nodal point in the center portion, means carried by the frame to support the member at its nodal point, and complementary electromagnetic means disposed, respectively, on the frame and on at least one of the portions to urge the portion out of its normal plane to drive the member in resonant vibratory motion in which the arms are flexed out of the common plane.

3. Resonant apparatus comprising a supporting frame, a four-armed cruciform plate carried by the frame, each of said arms including magnetic material, four electromagnetic coils carried by the frame and magnetically associated with the respective arms, certain of said coils being arranged to bias the arms out of their normal plane when energized by an A-C signal and to have an A-C signal induced therein by resonant movement of the arms, permanent magnetic means to establish magnetic coupling between the respective coils and arms in directions perpendicular to the plane, and amplifier means coupled between said coils to sustain the vibration of the plate in resonance, and means to couple the center of the plate to the frame.

4. Apparatus as set forth in claim 3, said permanent magnet means being carried by said cruciform plate, and ferromagnetic members disposed in each of said coils and coupled magnetically to said frame, said frame being formed of ferromagnetic material.

5. Apparatus as set forth in claim 3, said coils and magnets being polarized to buck out voltages generated by translational movement of the resonator plate as a unit in directions normal to its own plane.

6. Apparatus as set forth in claim 1, said means to support the resonant member comprising spring means resilient in the direction of flexing movement of the arms.

7. Apparatus as set forth in claim 6, said spring means comprising a multi-armed spring plate coupled to the frame adjacent the ends of its arms.

8. Apparatus as set forth in claim 6, including damping means to damp oscillation of the spring means.

9. Apparatus as set forth in claim 8, said damping means comprising a member coupled to the nodal point of the plate resonator, and friction means carried by the frame and engaging said member.

References Cited in the file of this patent

UNITED STATES PATENTS

| | | |
|---|---|---|
| 2,240,306 | Lakatos | Apr. 29, 1941 |
| 2,594,749 | Ehrat et al. | Apr. 29, 1952 |
| 2,928,057 | Targer | Mar. 8, 1960 |
| 2,957,062 | Bopp | Oct. 18, 1960 |